(12) United States Patent
Saadat

(10) Patent No.: US 9,821,472 B2
(45) Date of Patent: Nov. 21, 2017

(54) GRIPPING MECHANISM HAVING A LARGE STROKE

(71) Applicant: M. Mohsen Saadat, Soest (DE)

(72) Inventor: M. Mohsen Saadat, Soest (DE)

(*) Notice: Subject to any disclaimer, the term of this patent is extended or adjusted under 35 U.S.C. 154(b) by 0 days.

(21) Appl. No.: 15/246,221

(22) Filed: Aug. 24, 2016

(65) Prior Publication Data

US 2017/0057096 A1    Mar. 2, 2017

(30) Foreign Application Priority Data

Aug. 25, 2015 (DE) .................. 10 2015 010 884

(51) Int. Cl.
   *B25J 15/02*    (2006.01)
   *B25J 15/10*    (2006.01)
   *B25J 15/00*    (2006.01)

(52) U.S. Cl.
   CPC ....... *B25J 15/0028* (2013.01); *B25J 15/0266* (2013.01); *B25J 15/10* (2013.01)

(58) Field of Classification Search
   CPC .. B25J 15/0028; B25J 15/022; B25J 15/0266; B25J 15/0273; B25J 15/10; B25J 15/106; Y10S 901/36–901/39
   USPC ...... 294/198, 202, 106, 115, 119.1; 414/917
   See application file for complete search history.

(56) References Cited

U.S. PATENT DOCUMENTS

| | | | | |
|---|---|---|---|---|
| 3,069,761 A * | 12/1962 | Sommer | ............... | B25B 27/026 254/93 R |
| 4,456,293 A * | 6/1984 | Panissidi | ............... | B25J 13/082 294/106 |
| 4,975,016 A * | 12/1990 | Pellenc | .................. | A01D 46/24 294/185 |
| 5,484,181 A | 1/1996 | Saadat | | |
| 5,536,135 A * | 7/1996 | Robertson | ............ | B65G 47/912 414/728 |
| 5,667,354 A * | 9/1997 | Nakazawa | ............. | B25J 9/0084 414/744.5 |
| 6,505,870 B1 * | 1/2003 | Laliberte | ................ | B25J 15/103 294/106 |
| 8,388,035 B2 * | 3/2013 | Kamon | ............... | B25J 15/0266 294/106 |
| 8,720,964 B2 * | 5/2014 | Birglen | ................ | B25J 15/0009 294/106 |
| 2011/0241369 A1 * | 10/2011 | Kamon | .................... | B25J 9/102 294/213 |

FOREIGN PATENT DOCUMENTS

DE    3441643     * 5/1986
DE    265354       3/1989

* cited by examiner

*Primary Examiner* — Dean Kramer

(57) ABSTRACT

A ten-link gripping mechanism having a modular structure and a single degree of freedom, for robots, machines and handling devices, includes at least one eight-link finger mechanism with a gripper jaw, guided as a coupler by two four-bar linkages based one on the other. The choice of the dimensions of the individual elements enables the movement of the gripper jaw to be adapted to the task at hand while using only a single drive. The drive can be of a universal type, such as pneumatic, electromotive, magnetic or by means of a spring.

18 Claims, 15 Drawing Sheets

GRIPPING MECHANISM HAVING A LARGE STROKE

CROSS-REFERENCE TO RELATED APPLICATION

This patent application claims priority under 35 U.S.C. 119 to German patent application DE 10 2015 010 884.0, filed Aug. 25, 2015, which is hereby incorporated herein by reference.

TECHNICAL FIELD

The invention relates to a gripping mechanism for robots, machines and handling devices, comprising at least one movable gripper finger, which is guided as a coupler of an eight-link to ten-link finger mechanism on a trajectory which can also be an approximate or an exact straight line, in constrained motion, i.e. having a single degree of freedom, and which cooperates with at least one other fixed or movable gripper finger.

BACKGROUND

WO 92/20496 (U.S. Pat. No. 5,484,181) shows a gripping mechanism of the generic type, comprising at least one movable gripper finger, guided as a coupler of a six-link guiding mechanism with a central sliding joint. The central sliding joint is in the form of a pneumatic cylinder having a continuous piston rod and serves as a common drive element for all gripper fingers of the same gripping mechanism. The gripper finger of this gripping mechanism moves on an exact straight line normal to the longitudinal axis A of the gripper. The parallel gripping range, i.e. the gripping stroke, of this gripping mechanism is small in relation to current requirements on a flexible gripper.

German Democratic Republic Patent DD 2 65 354 A1, in FIG. 2, shows a gripping mechanism for handling devices having two gripper jaws 7. Each gripper jaw 7 is guided by means of a ten-link mechanism on an exact straight line. The coupling point G of the mechanism, also guided in an exact straight line and in the same direction, serves as a drive point for the movement of the gripper jaw and as a synchronization point of the movement of the two gripper jaws. The coupling point G of the mechanism is driven by a spindle drive 11 and 12. The mechanism thus makes itself redundant since it is possible to directly drive the gripper jaws with the straight-line spindle drive like a parallel vise.

SUMMARY

The invention is based on the object to provide a gripping mechanism having a large gripping stroke and providing the possibility of guiding the gripper jaw approximately or exactly in parallel, with a single degree of freedom and drive.

The object is achieved according to the invention by the features indicated in the independent claims.

The dependent claims recite advantageous embodiments of the invention.

In its most basic configuration, the gripping mechanism according to the invention has a finger mechanism, comprising a movable gripper jaw working against a fixed gripper jaw or any other fixed portion that is attached on the gripper casing or gripper flange or on the machine. The finger mechanism preferably has a jaw carrier on which the gripper jaw is exchangeably attached as a connection element between the gripper finger and the gripping object.

Either the jaw itself or the jaw carrier is an element of an eight-link finger mechanism and is guided as a coupler of the first four-bar linkage which is preferably a parallelogram four-bar linkage, by two long elements at two points on a flat coupler curve. This coupler curve can also become, in parts, a mathematically exact straight line when the dimensions of the individual elements are selected accordingly.

Of the first four-bar linkage, the element opposite the jaw carrier represents the coupler of a second four-bar linkage, which is also preferably a parallelogram four-bar linkage. The coupler of the second four-bar linkage is guided at two points by two elements, which are supported in the base of the finger mechanism. The base of the finger mechanism forms the flange of the gripping mechanism.

A long element of the first four-bar linkage adjacent to the jaw carrier is a binary element and has two hinges. The second long element adjacent to the jaw carrier is a ternary element having three hinges, in the form of a triangle having an obtuse angle, which can also include a flat angle of 180°, of which the third hinge is hinged to the base of the finger mechanism by a binary element. The finger mechanism thus created provides an eight-link kinematic chain with a single degree of freedom ($F=1$) without driving elements. The element opposite the jaw carrier is usually a quaternary element and comprises four hinges, which have a common axis in pairs and can thus form a double hinge.

The finger mechanism has three elements supported in the base. Each of these three elements can be used as a drive. The drive can be pneumatic, hydraulic, electromotive, magnetic or by means of a pre-stressed spring.

When a sliding joint, such as a pneumatic or hydraulic cylinder, or a spindle drive, is used as a drive, it is recommendable to attach the three elements supported on the base at the element of the sliding joint that is movable in a translatory movement so that the base of the eight-link finger mechanism becomes the drive element of the entire gripping mechanism. The axially immovable element of the sliding joint, the driving rod or the piston rod in the case of a pneumatic cylinder, or the spindle bearing in the case of an electromotive spindle drive, is connected to the gripper flange. By these means, the gripping jaw moves on a trajectory that is closest to a straight line. Moreover, the movable element of the sliding joint serves as a driving and synchronization element for all finger mechanisms of the same gripper.

A gripping mechanism can also have a plurality of finger mechanisms designed in this fashion, which move in synchronism with a single drive, or which have their own drives either individually or in groups. The dimensions of the individual elements of the finger mechanism determine the trajectory of the gripper jaw. With suitable synthesis, selection of the dimensions of the mechanical elements and the position of the hinges of the finger mechanism, the gripper jaw, when it is opened, moves in a direction normal to the longitudinal axis A of the gripping mechanism and then backwards towards the flange.

The details of various embodiments of the invention are set forth in the accompanying drawings and the description below. Numerous other features and advantages of the invention will be apparent from the description, the drawings, and the claims.

DESCRIPTION OF THE DRAWINGS

Identical parts are indicated by the same reference numerals. Indices with letters indicate different versions of the same element.

DETAILED DESCRIPTION

Figure 1:
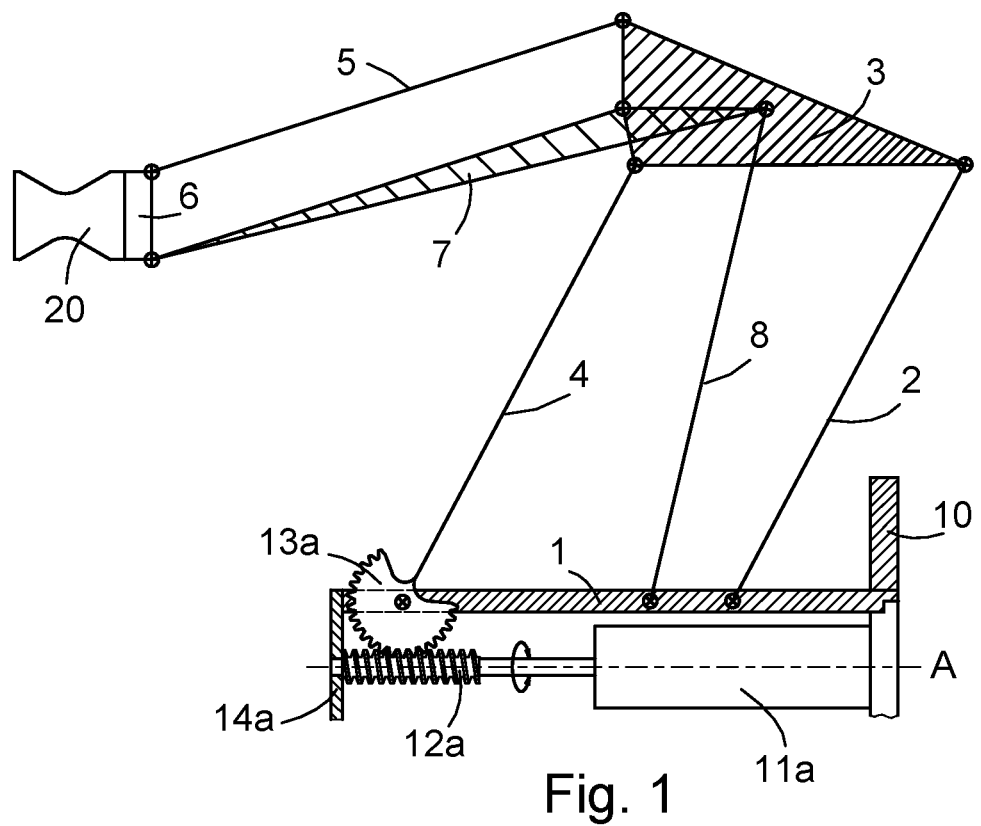
FIG. 1 is a schematic representation of a gripper mechanism comprising an eight-link finger mechanism according to the present invention and a central drive for a plurality of finger mechanisms positioned about the axis A.

In accordance with FIG. 1, the gripping mechanism having finger mechanisms 1, 2, 3, 4, 5, 6, 7 and 8 comprises a movable gripper jaw 20 exchangeably attached to the jaw carrier 6. The jaw carrier 6, as a coupler of the first four-bar linkage 3, 5, 6 and 7, is connected to the long elements 5 and 7 by two hinges. At their other ends, the long elements 5 and 7 are hinged to the element 3. The four-bar linkage 3, 5, 6 and 7 is preferably a parallelogram four-bar linkage, so that the long elements 5 and 7 are parallel and have the same length.

The long element 7 adjacent to the jaw carrier is a ternary element having its third hinge connected to the ternary element 1 of the finger mechanism by the binary element 8. The ternary element 1 is the base of the finger mechanism.

The second long element 5 adjacent to the jaw carrier 6 is a binary element.

The element 3 of the first four-bar linkage 3, 5, 6 and 7, opposite the jaw carrier 6, in its most basic form, is a quaternary element having four hinges, which can be combined in pairs to form double hinges. The quaternary element 3 as a coupler of the second four-bar linkage 1, 2, 3 and 4 is guided at two hinges by two long binary elements 2 and 4 which are hingedly supported on the other side on the ternary element 1. The second four-bar linkage 1, 2, 3 and 4 is also preferably a parallelogram four-bar linkage so that the long elements 2 and 4 are parallel and have equal lengths.

The base of the finger mechanism 1 is fixedly connected to the gripper flange 10 and, in this arrangement, also serves as a base of the entire gripping mechanism, which can comprise a plurality of finger mechanisms radially arranged about the axis A.

The drive comprises a common electric motor having a worm shaft and one worm gear per each finger mechanism. The electric motor 11a is fixed on the central axis A on the base 1 and the flange 10 of the gripping mechanism and serves as a drive for all finger mechanisms. With its worm shaft 12a it drives all worm gears 13a of the finger mechanisms which are each fixed to the finger mechanism by the element 4. The worm shaft 12a is rotatably supported in the front portion 14a of the gripping mechanism in the casing 1, 10 and 14a. Instead of the element 4, the two other elements 2 or 8 supported on the element 1 can also be used as a driving element. Of course, each finger mechanism can also have its own drive. In that case, the drive motors are juxtaposed axially and in parallel.

Figure 2:
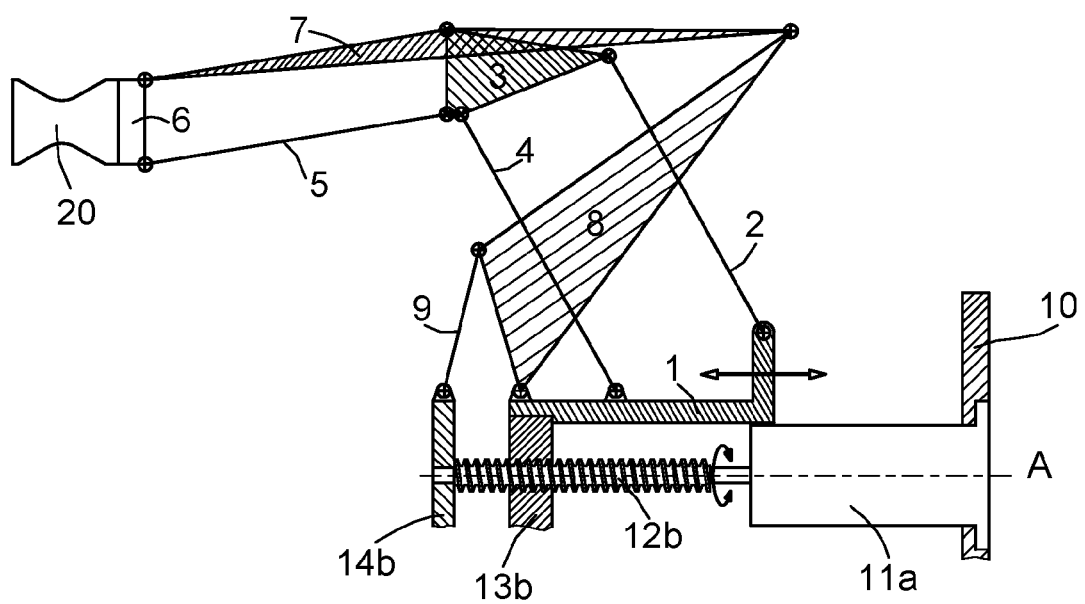
FIG. 2 is a schematic representation of a gripping mechanism comprising an eight-link finger mechanism according to the present invention and a sliding joint as a central drive for all the finger mechanisms positioned about the axis A.

FIG. 2 schematically shows a gripping mechanism comprising an eight-link finger mechanism according to the present invention and a sliding joint as a central drive for all the finger mechanisms positioned about the axis A. The axially movable element of the sliding joint, the slider, forms the base of all finger mechanisms of the gripper. The drive consists of a common electric motor having a spindle shaft and a spindle nut. The electric motor is fixed by means of the flange of the gripper mechanism. Its spindle shaft is rotatably supported in the front portion of the base and moves the spindle nut back and forth and, with it, the slider of the sliding joint in parallel to the axis A. An additional binary element having two hinges connects one of the elements of the three elements hingedly supported on the slider of the sliding joint with the front portion of the base of the gripping mechanism and thus ensures transmission of the movement of the spindle nut to the finger mechanism.

According to FIG. 2, the positions of the long elements 5 and 7 on the jaw carrier have been exchanged. The element 8, which connects the ternary element 7 with the base 1 of the finger mechanism 1, 2, 3, 4, 5, 6, 7 and 8, has a third hinge which is pivotably connected to the front portion of the front plate 14b of the gripping mechanism by the binary element 9. The front plate 14b is a portion of the gripper casing and attached to the gripper flange 10.

The electric motor 11a is attached on the gripper flange 10. It drives the spindle shaft 12b which is rotatably supported in the front plate 14b of the gripping mechanism. The front plate 14b is a portion of the gripper casing. It is connected to the gripper flange 10. The spindle shaft 12b moves the spindle nut 13b along the gripper axis A. The spindle nut 13b is fixed by the ternary element 1 of all finger mechanisms 1, 2, 3, 4, 5, 6, 7 and 8 and moves the element 1 back and forth parallel to the gripper axis A. The ternary element 8, and with it the entire finger mechanism, is rotatably moved by the hinge connection of the element 8 to the front plate 14b of the gripping mechanism via the binary element 9. If the element 1 moves toward the gripper flange, the gripping mechanism opens, and vice versa.

Figure 3:
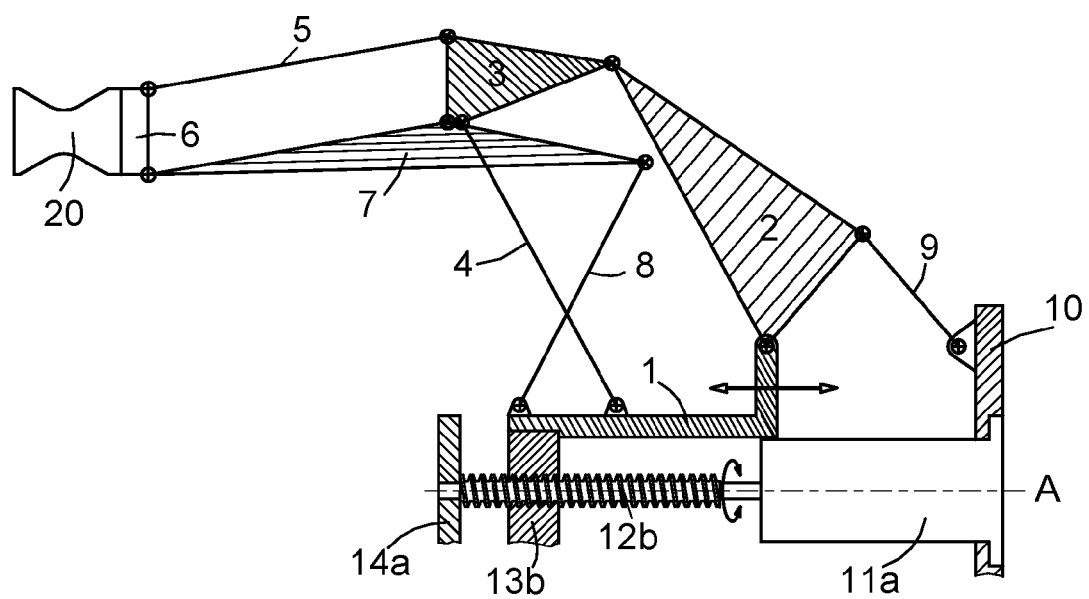
FIG. 3 is a schematic representation of a gripping mechanism, comprising an eight-link finger mechanism and an electromotive drive with a spindle shaft and a spindle nut as a central sliding joint for all finger mechanisms.

FIG. 3 schematically shows a gripping mechanism, comprising an eight-link finger mechanism and an electromotive drive with a spindle shaft and a spindle nut as a central sliding joint for all finger mechanisms. The movable element, the slider, of the central sliding joint forms the base of the finger mechanism, while the fixed element is connected to the electric motor and the gripper flange. The relative movement of the slider is transferred from the flange side to one of the three elements by an additional binary element, which is hinged to the slider of the central sliding joint.

According to FIG. 3, the binary element 9 is hinged on the one hand to the gripper flange 10 and on the other hand to the rear element 2 of the three elements 2, 4 and 8 of the finger mechanism supported on the ternary element 1. The element 2 thus becomes a ternary element. If the element 1 moves toward the gripper flange, the gripping mechanism is closed and vice versa. The front plate 14a is part of the gripper casing and is connected to the gripper flange.

Figure 4:
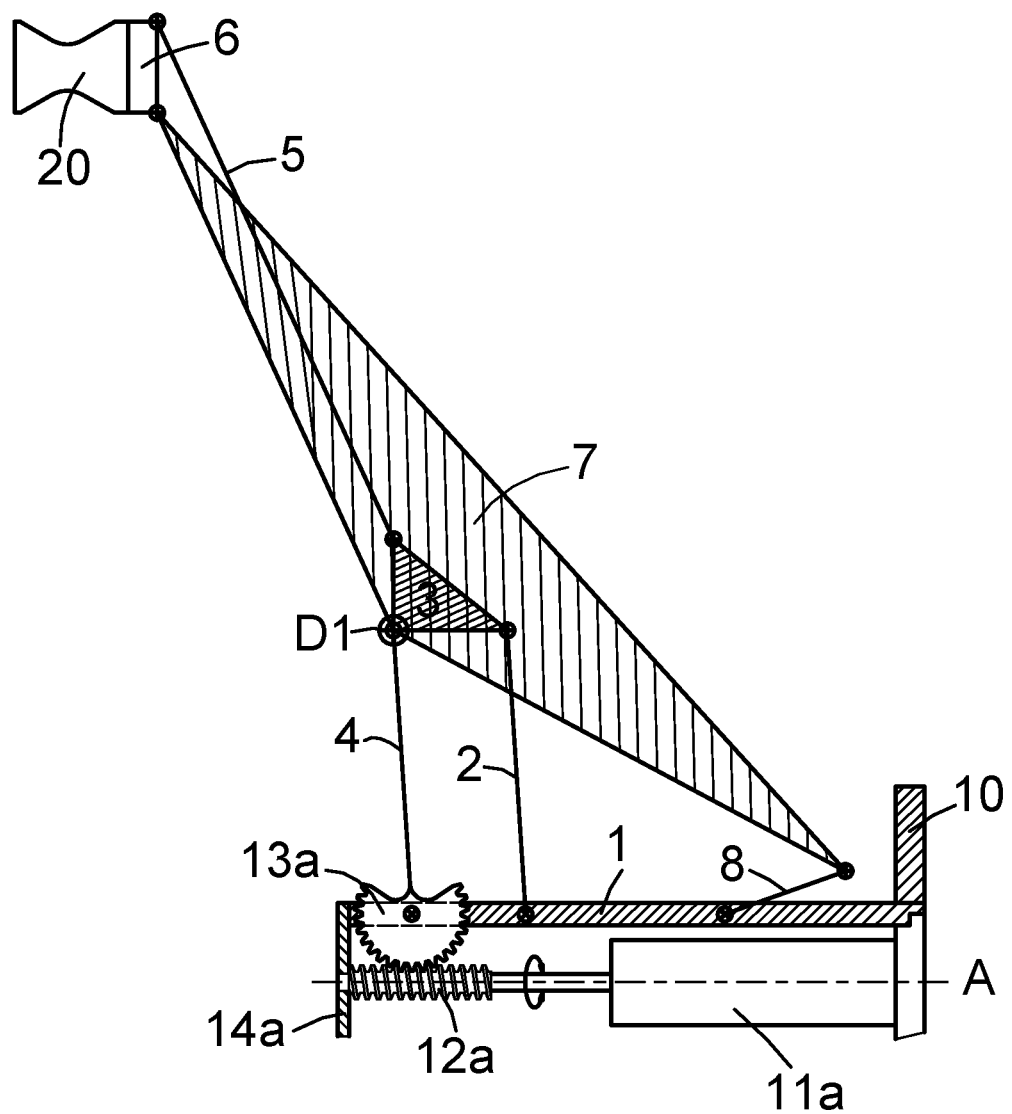
FIG. 4 is a schematic representation of a gripping mechanism, comprising a finger mechanism according to the present invention in an open position and an electromotive drive with a worm shaft for all finger mechanisms involved in the gripper and a worm gear per each finger mechanism.

FIG. 4 schematically shows a gripping mechanism, comprising a finger mechanism according to the present invention in an open position and an electromotive drive with a worm shaft for all finger mechanisms involved in the gripper and a worm gear per each finger mechanism. Two hinges are arranged on a common axis A at the common element of the two four-bar linkages, and form a double hinge.

According to FIG. 4, the hinge between the elements 3 and 7 of the first four-bar linkage 3, 5, 6 and 7 and the hinge between the elements 3 and 4 of the second four-bar linkage 1, 2, 3 and 4 are arranged on the common element 3 on a common axis in a coaxial fashion and together form a double hinge D1. In this arrangement, the elements 1, 4, 7 and 8 form a third four-bar linkage, where the long element 7 of the first four-bar linkage is guided as a coupler. The drive is by means of the electric motor 11a, the worm shaft 12a and the worm gear 13a, as described with reference to FIG. 1.

Figure 5:
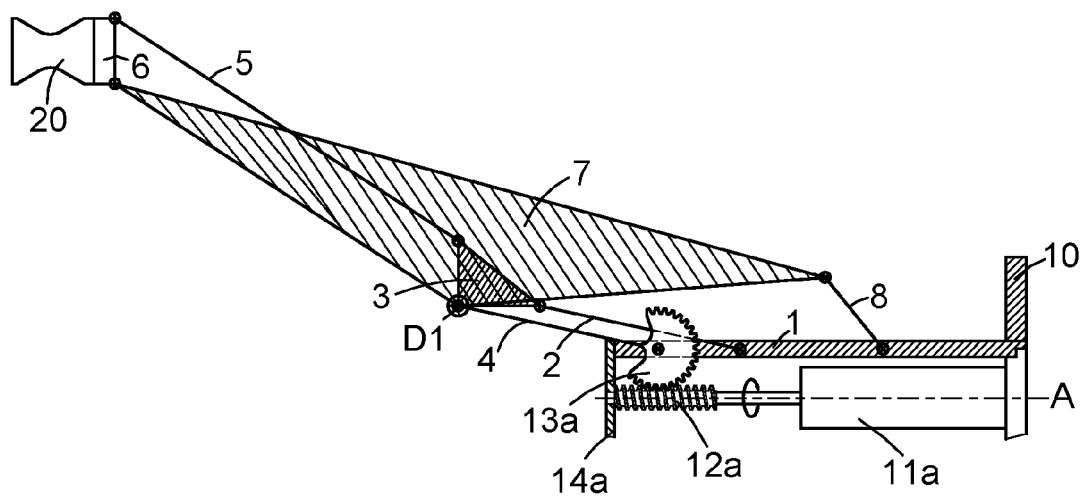
FIG. 5 is a schematic representation of the gripping mechanism according to FIG. 4 in a closed position.

FIG. 5 shows a gripping mechanism with a finger mechanism according to the present invention, in accordance with FIG. 4, in a closed position.

Figure 6:
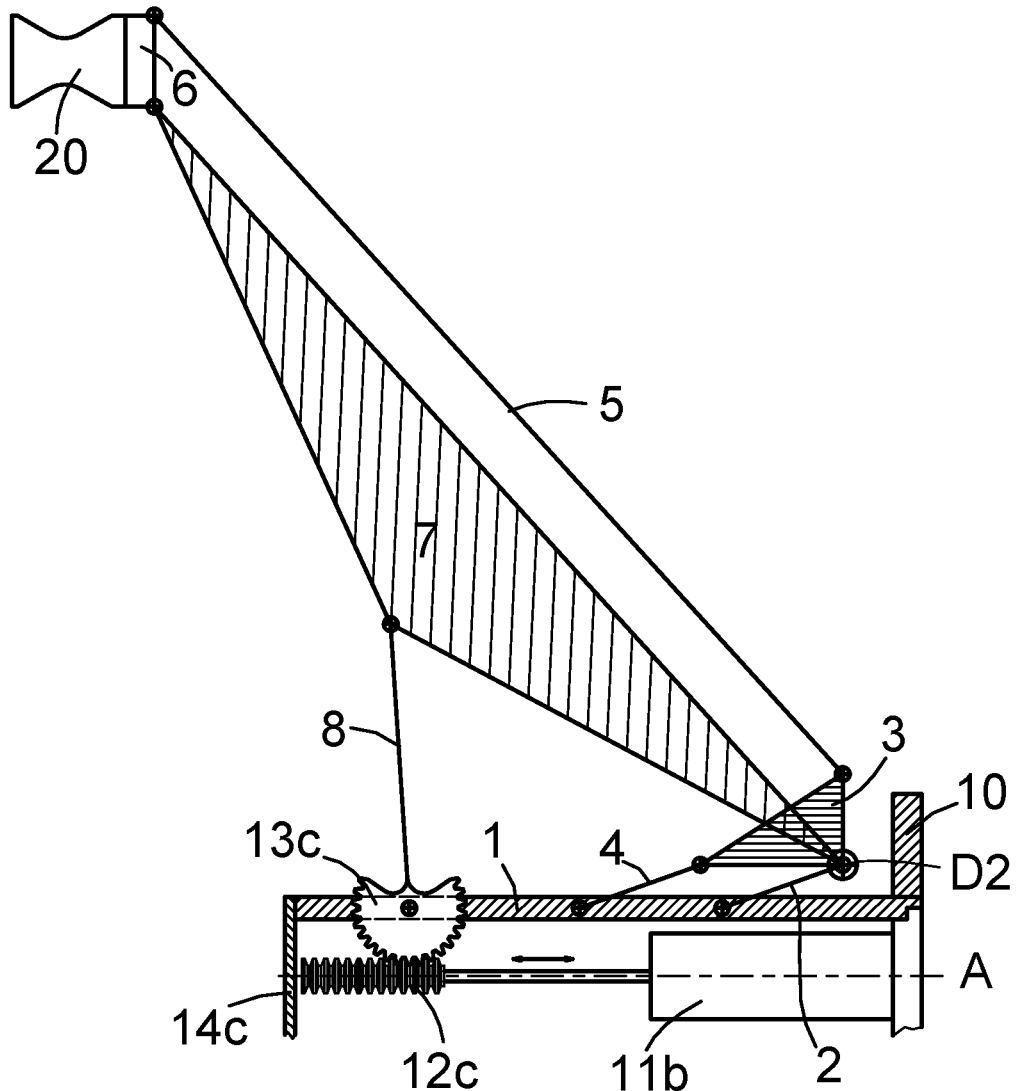
FIG. 6 is a schematic representation of a gripping mechanism having a finger mechanism in an open position, a gear segment and a round-toothed rack as a drive.

FIG. 6 schematically shows a gripping mechanism having a finger mechanism in an open position, a gear segment and a round-toothed rack as a drive. The gear segment is a part of the element connecting the ternary element adjacent to the jaw carrier with the base of the finger mechanism. The double hinge of the first four-bar linkage is formed with the rear element of the second four-bar linkage. The translatory movement of the rack can be caused by pneumatic or electromotive means.

According to FIG. 6, the drive of the gripping mechanism is by pneumatic means by means of a pneumatic cylinder 11b with the aid of the round-tooth rack 12c and the gear 13c. The rack 12c is connected to the piston rod of the pneumatic cylinder 11b and turns the gear 13c which is linked, in the present arrangement, to the element 8 of the finger mechanism. Herein the double hinge D2 is created by the coaxial arrangement of the two hinges between the elements 3 and 7 of the first and 2 and 3 of the second four-bar linkage. By these means, the element 7 of the four-bar linkage 3, 5, 6 and 7 does not cross the element 5, and the force transmission from the gripper jaw 20 to the other elements of the finger mechanism is improved.

When a plurality of finger mechanisms are placed about the gripper axis A to form a multi-finger gripping mechanism, the round-tooth rack 12c, via the pneumatic cylinder 11b as a drive element, synchronously drives all the gears 13c positioned about the rack.

Figure 7:
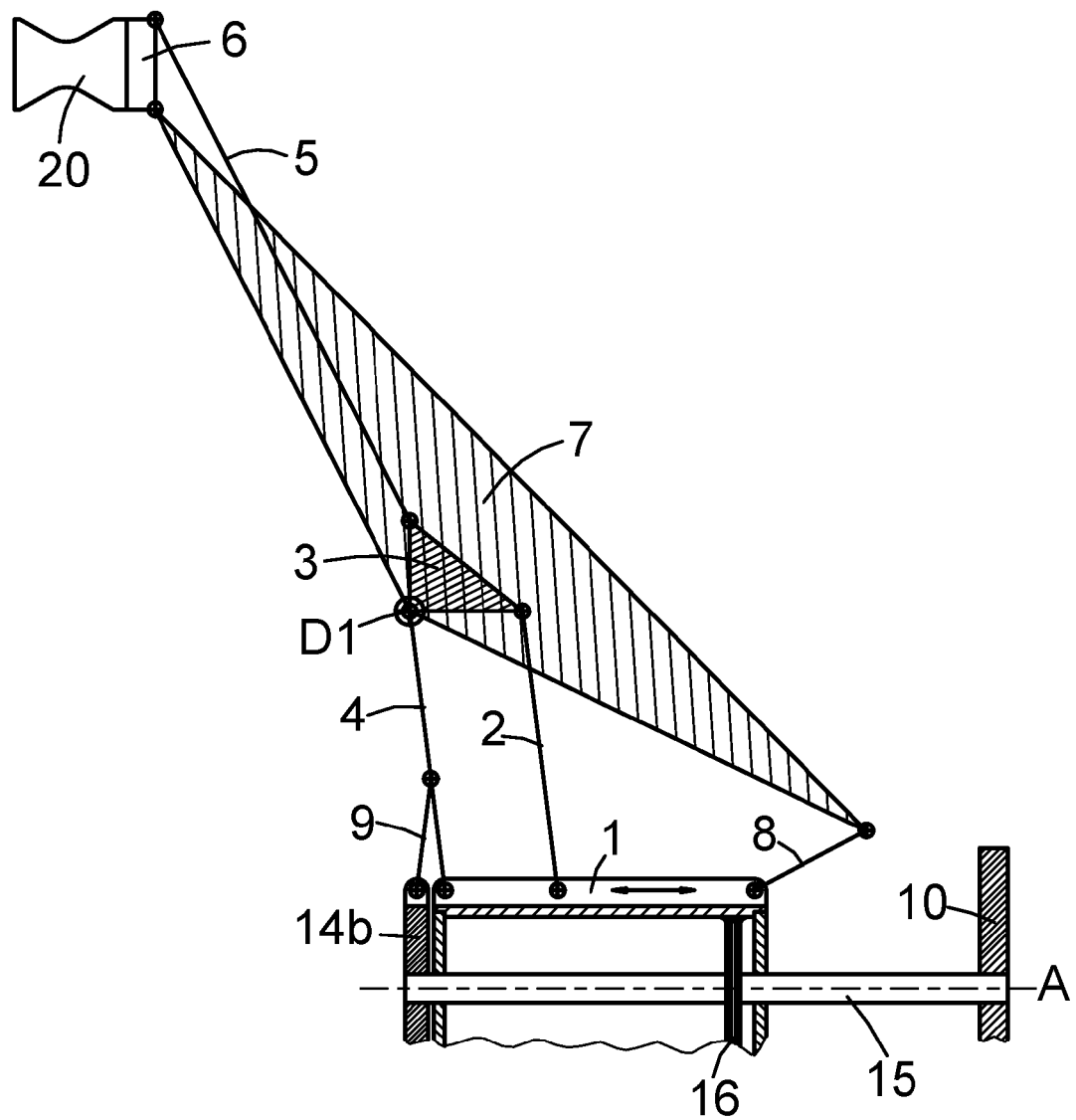
FIG. 7 is a schematic representation of a gripping mechanism with a finger mechanism of the present invention in an open position.

FIG. 7 shows a gripping mechanism with a finger mechanism 1, 2, 3, 4, 5, 6, 7 and 8 according to the present invention in accordance with FIG. 5 with a pneumatic cylinder having a continuous piston rod 1, 10, 14b, 15 and 16 and an additional binary element 9 as a drive. The base of the finger mechanism forms the movable cylinder of a pneumatic drive, wherein the continuous piston rod is connected to the gripper flange and forms the base of the gripping mechanism. A binary element connects the front portion of the base of the gripping mechanism with one of the three elements jointed on the movable cylinder, i.e. on the base of the finger mechanism, and transmits the drive motion of the pneumatic cylinder to the elements of the finger mechanism. The double hinge is formed by the ternary element of the first four-bar linkage adjacent to the jaw carrier and the front element of the second four-bar linkage, on which the binary drive element is also hinged.

The ternary element 1 of the finger mechanism is connected to the movable cylinder of the drive unit and moves back and forth in parallel to the gripper axis A. The binary element 9 connects the element 4 of the second four-bar linkage 1, 2, 3 and 4 by means of the front plate 14b and the piston rod 15 to the gripper flange 10 of the gripping mechanism. From a kinematic point of view, the thus created gripping mechanism has ten elements 1, 2, 3, 4, 5, 6, 7, 8, 9 and 10. The piston 16 is fixedly connected to the piston rod 15. The two parts 15 and 16 connect the front plate 14b with the gripper flange of the gripping mechanism. The four connected and immovable parts 10, 14b, 15 and 16 form the gripper casing and are regarded, kinematically, as a single part. In combination, they form the base of the ten-link gripping mechanism 1, 2, 3, 4, 5, 6, 7, 8, 9 and 10.

Figure 8:
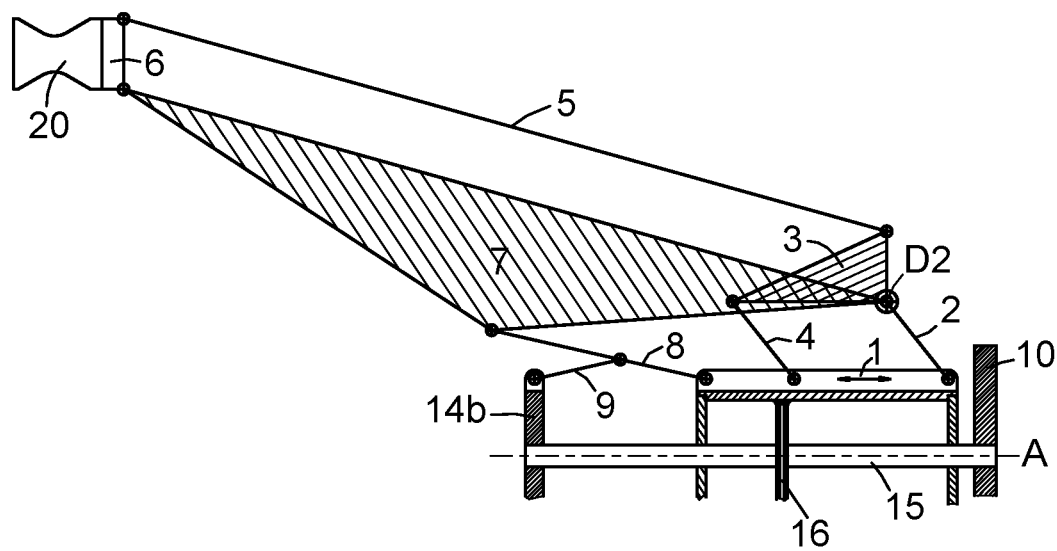
FIG. 8 is a schematic representation of a gripping mechanism with a finger mechanism according to the present invention in a closed position and a pneumatic drive, according to FIG. 7.

FIG. 8 shows a gripping mechanism according to FIG. 6 with a pneumatic drive, as described with reference to FIG. 7, however in a position with the gripper jaws 20 closed. The double hinge is situated on the ternary element adjacent to the jaw carrier and the rear element of the second four-bar linkage closer to the gripper flange. The element 3 of the first four-bar linkage 3, 5, 6 and 7, opposite the jaw carrier 6, is positioned on the element 2 closer to the gripper flange of the second four-bar linkage 1, 2, 3 and 4 and forms the double hinge D2 between the elements 2, 3 and 7.

Figure 9:
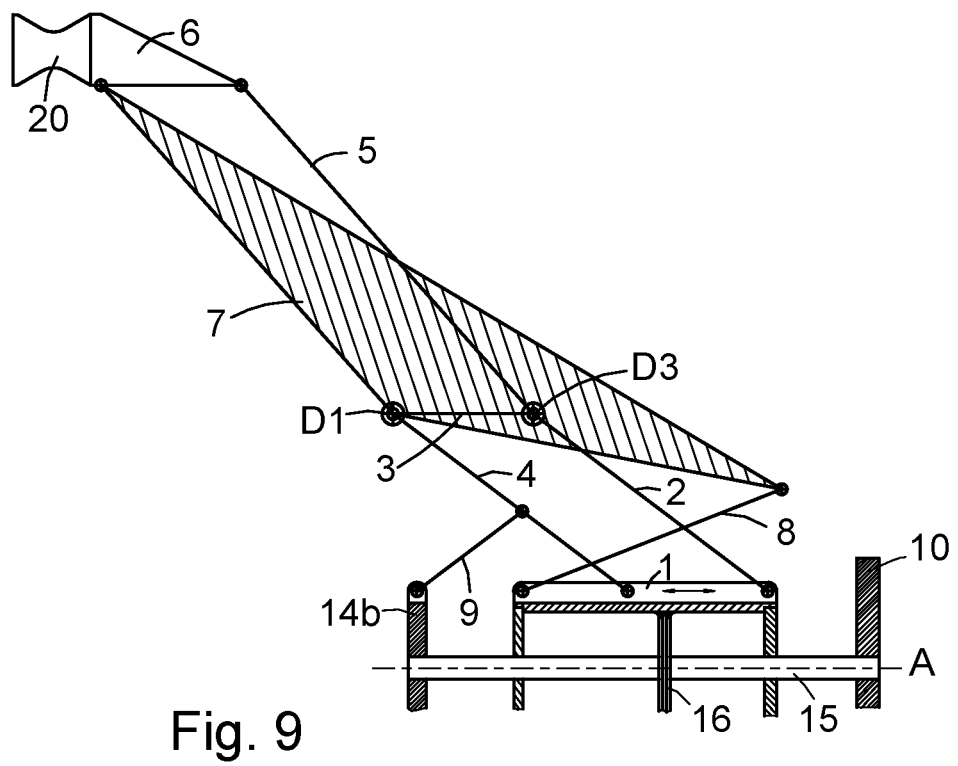
FIG. 9 is a schematic representation of a gripping mechanism with a finger mechanism according to the present invention, wherein a double hinge is formed of two hinge pairs of each of the two four-bar linkages.

FIG. 9 shows a gripping mechanism with a finger mechanism 1, 2, 3, 4, 5, 6, 7 and 8 according to the present invention and a pneumatic drive as described with reference to FIG. 7. The four hinges of the quaternary element 3 are combined in coaxial pairs and have been reduced to form two double hinges D1, D3. The two four-bar linkages 3, 5, 6 and 7 and 1, 2, 3 and 4 are each configured as parallelogram four-bar linkages. By these means, the gripper jaw 20 moves in parallel to the gripper axis A and to the base of the gripping mechanism. The binary element 9 links the front plate 14b to the front element 4 of the second four-bar linkage, and makes a ternary element out of it. The binary element 8 connects the ternary element 7 to the ternary element 1 serving as the cylinder of the pneumatic drive unit in the front area and thus crosses the elements 2 and 4. By these means, the gripper jaw 20 moves along a very flat trajectory, which closely approximates a straight line.

Figure 10:
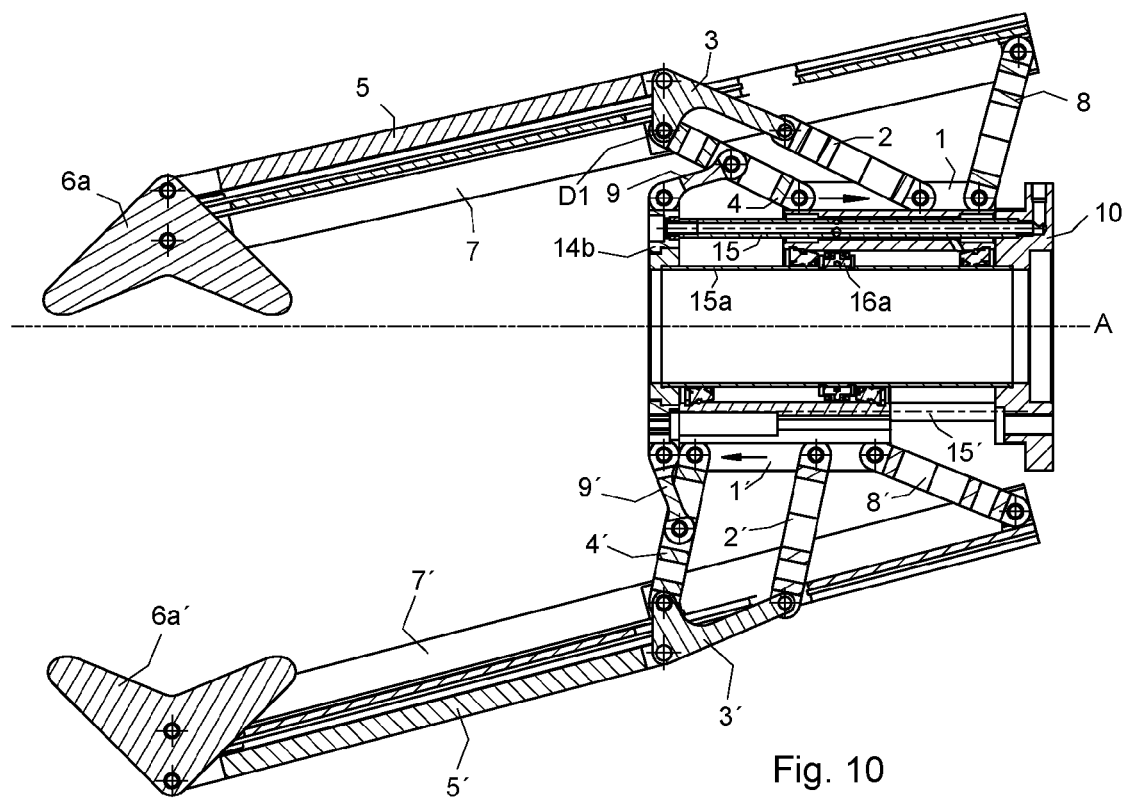
FIG. 10 is a longitudinal section of a two-finger gripping mechanism showing the top finger mechanism in a closed position and the bottom finger mechanism in an open position.

FIG. 10 is a longitudinal section of a two-finger gripping mechanism in accordance with the kinematic arrangement of FIG. 7 showing the top finger mechanism in a closed position and the bottom finger mechanism in an open position. The closed finger mechanism in the top half shows the drive cylinder in its rightmost position close to the flange. The open finger mechanism in the bottom half of FIG. 10 shows the drive cylinder at the left stop of the base at the front plate. The ternary element 7 is long. It forms a triangle with a flat angle of 180°, i.e. all three hinges are arranged on a straight line. The top finger mechanism is shown in the closed position, and the bottom finger mechanism is shown in the open position. The gripper jaw 6a is guided as a coupler of the first four-bar linkage 3, 5, 6a and 7. The ternary element 3 is guided as a coupler of the second four-bar linkage 1, 2, 3 and 4. The two four-bar linkages have a common double hinge, which pivotably connects the three elements 3, 4 and 7. The extension of the long ternary element 7 is linked to the ternary element 1 by the binary element 8. The element 1 is the slider of the sliding joint 1 and 15 and slides on a plurality of guide rods 15. It is formed as the cylinder of a pneumatic drive, whose piston tube 15a is clamped between the gripper flange 10 and the front plate 14b, and at the middle of which the piston ring and the piston seal 16a are fixed on both sides by means of two locking rings. The binary element 9 pivotably links the front plate 14b to the element 4 of the second four-bar linkage 1, 2, 3 and 4. The back-and-forth movement of the drive cylinder 1 causes the up-and-down movement of the gripper jaw 6a. When the drive cylinder is at its right stop close to the flange, the gripper jaw 6a is in the closed position, as shown in the top half of FIG. 10. When the drive cylinder is at its left stop, as shown in the bottom half of FIG. 10, the gripper jaw 6a' is in the open position. The ternary element 7 forms a triangle having a flat angle of 180°. All three hinges are on a straight line.

Figure 11:
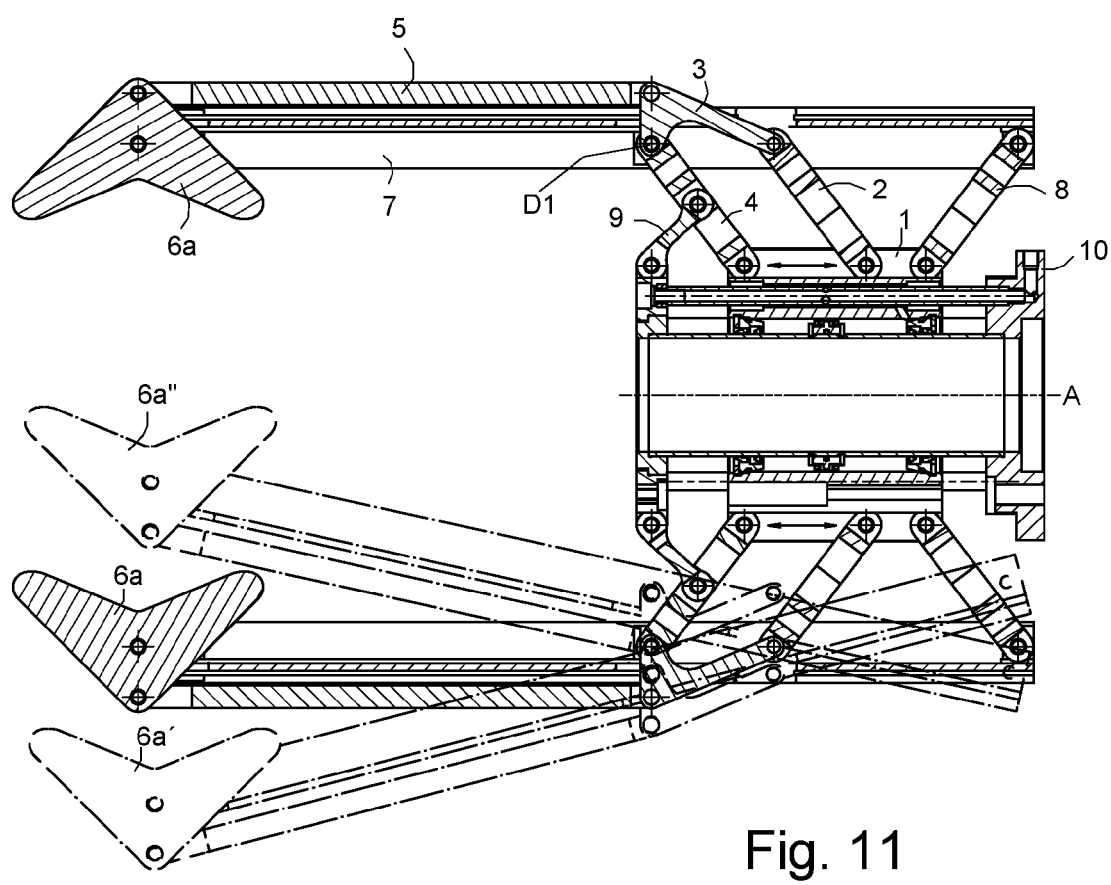
FIG. 11 is a sectional view of a two-finger gripping mechanism in a central position of the top finger mechanism, and various positions of the bottom finger mechanism, to show the parallel movement of the gripper jaw.

FIG. 11 is a longitudinal section of a two-finger gripping mechanism in accordance with the kinematic arrangement of FIG. 7. The ternary element 7 is long and forms a straight line. The top finger mechanism is in the central position. The bottom finger mechanism simulates the parallel guiding of the gripper jaw 6a' in three different positions during the gripping action.

Figure 12:
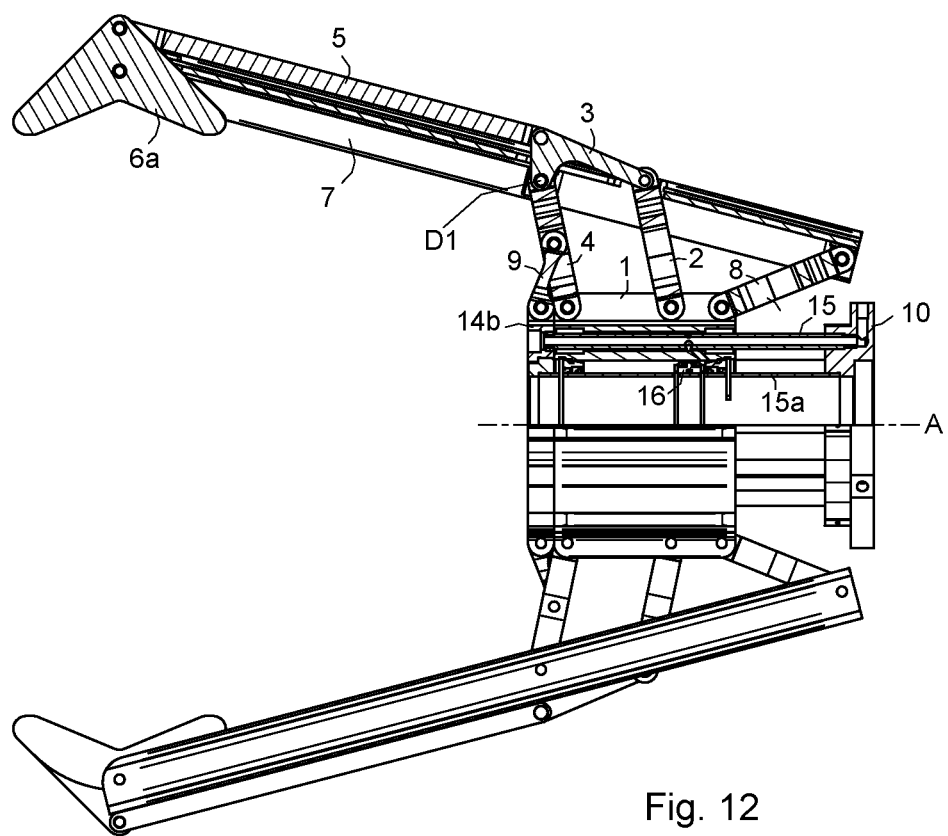
FIG. 12 is a perspective view of the two-finger gripping mechanism of FIGS. 10 and 11 in a quarter section of the top half.

FIG. 12 shows the same two-finger gripping mechanism according to FIGS. 10 and 11 in a three-dimensional view. The top finger mechanism 1, 2, 3, 4, 5, 6a, 7, 8, 9 and 10 is shown in section in order to make the details visible.

Figure 13:
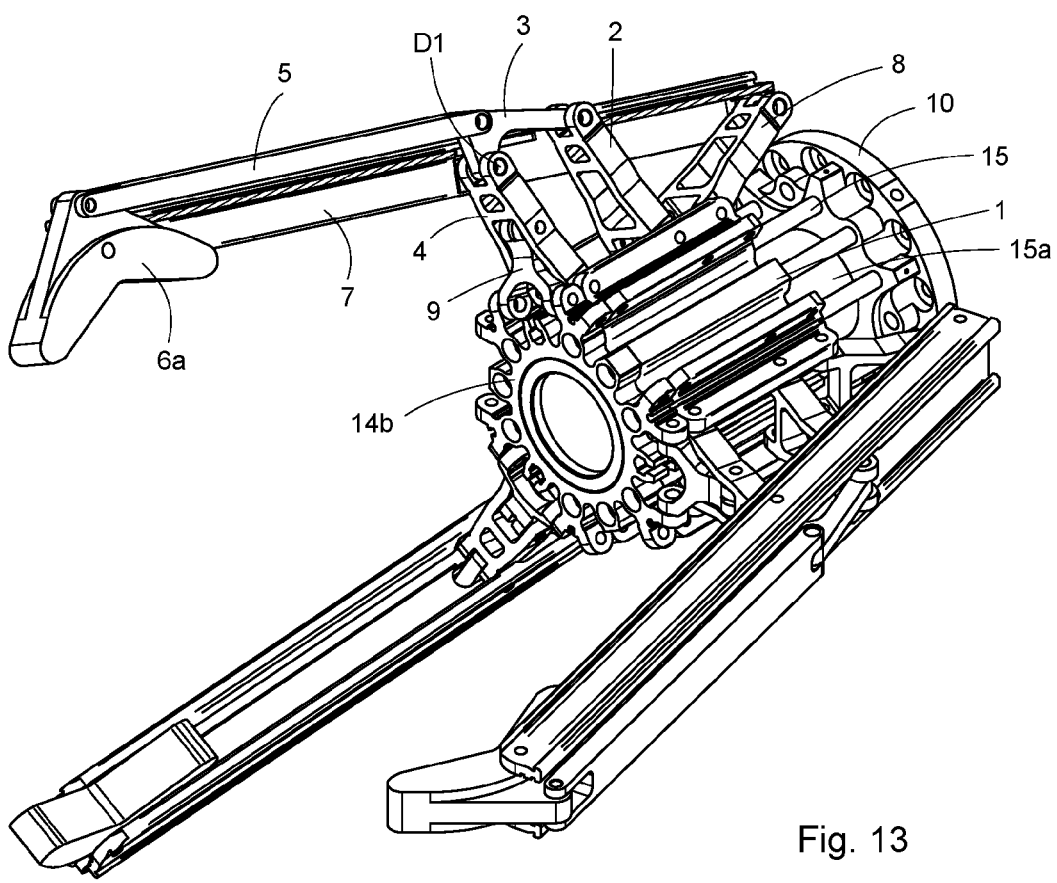
FIG. 13 is a perspective three-dimensional view of a three-finger gripping mechanism.

FIG. 13 shows a three-finger gripping mechanism based on the kinematics of FIG. 7, in a 3D view. The finger of the top finger mechanism is sectioned in order to better illustrate the arrangement of the links and the hinges. The ternary element 7 is long and forms a straight line.

Figure 14:
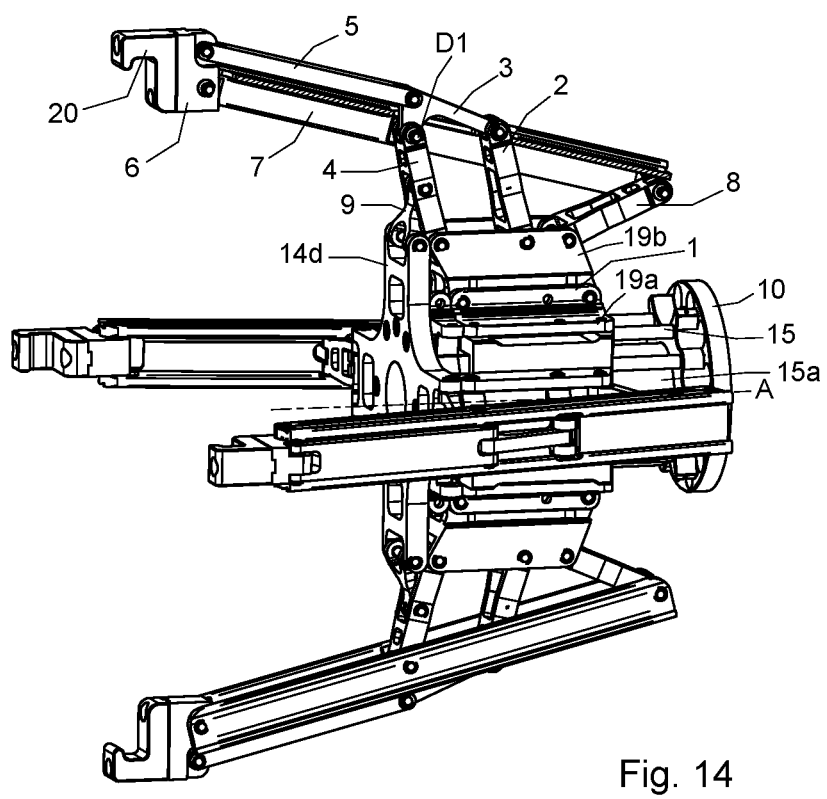
FIG. 14 is a perspective view of a four-finger gripping mechanism, where the gripper jaws are attached to jaw carriers.

FIG. 14 shows a four-finger gripping mechanism based on the same kinematic principle as FIG. 7, where the gripper jaws are attached to jaw carriers. The ternary element 7 is long and forms a straight line. The long element 7 of the top finger mechanism is shown in a longitudinal section. The gripper jaw 20 is exchangeably attached on the jaw carrier, the element 6 of the first four-bar linkage 3, 5, 6 and 7. In order to extend the gripping range of the finger mechanisms, the finger mechanisms are attached to range-extending parts 19a and 19b, which are fixed to the cylinder 1 of the operating unit.

Figure 15:
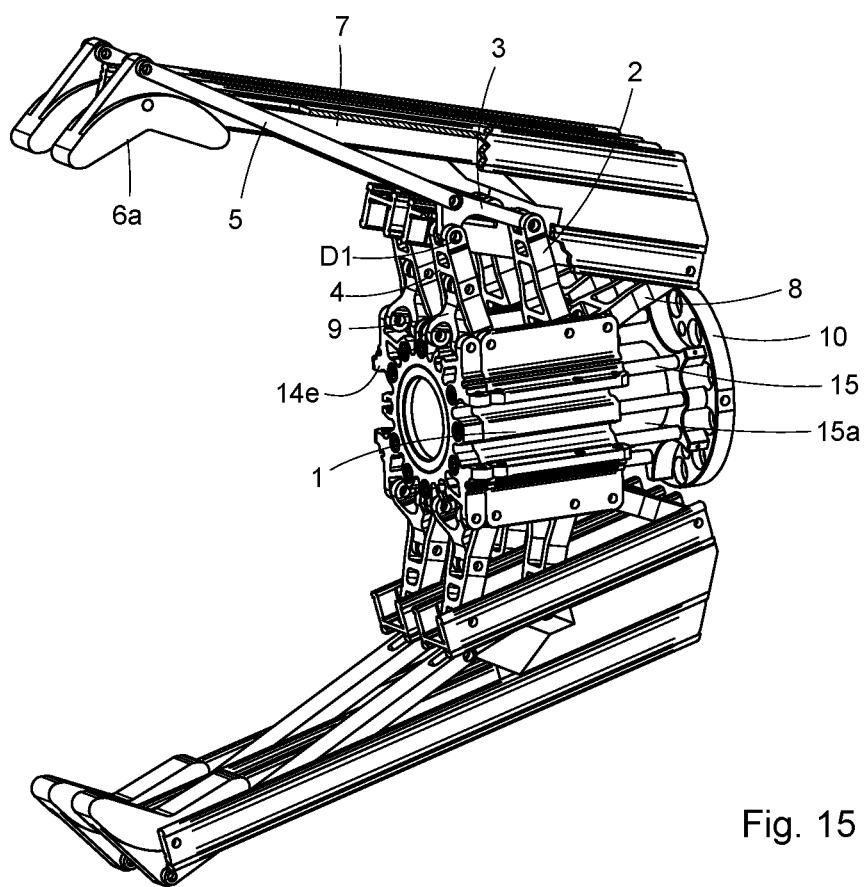
FIG. 15 is a perspective view of a four-finger gripping mechanism in accordance with FIG. 7, having a pneumatic drive.

FIG. 15 shows a four-finger gripping mechanism in accordance with FIG. 7, having a pneumatic drive. The ternary element 7 is long and forms a triangle with a flat angle of about 165°. The binary element 5 passes through the element 7, which is shown in the top half as a partial section for clarity.

Any number of the described finger mechanisms according to FIGS. 1 to 9 may be arranged in accordance with FIGS. 10 to 15 about the axis A in any geometric shape and arrangement, such as flat, triangular, rectangular or hexagonal, and can be combined to form a gripping mechanism operated in synchronism by a single central drive, by pneumatic, electromotive, magnetic or by means of a pre-stressed spring. Alternatively, each finger mechanism can have its own drive in order to individually control the fingers.

The features of the invention disclosed in the description, the drawings and the claims can be of importance for the realization of the invention both individually and in any combination.

There has been described a system and method for a gripping mechanism having a large stroke. While several particular forms of the invention have been illustrated and described, it will be apparent that various modifications and combinations of the invention detailed in the text and drawings can be made without departing from the spirit and scope of the invention. Accordingly, it is not intended that the invention be limited, except as by the appended claims.

What is claimed is:

1. A gripping mechanism for robots, machines, handling devices and the like, comprising:
  a gripper flange,
  a linkage mechanism having at least eight bar elements, and
  at least one moveable gripper jaw or finger, guided in constrained motion by the linkage mechanism on a trajectory,
  the moveable gripper jaw or finger being guided as a coupler of a first four-bar linkage of the linkage mechanism that is pivotably guided by a long binary element and a long ternary element of the first four-bar linkage, the long binary element and the long ternary element being pivotably linked to a fourth element of the first four-bar linkage that is pivotably guided as a coupler of a second four-bar linkage by two elements of the second-four-bar linkage that are pivotably linked to a ternary element of the second four-bar linkage, the ternary element of the first four-bar linkage being pivotably linked to the ternary element of the second four-bar linkage by a further element,
  the ternary element of the second four-bar linkage being connected directly or indirectly to the gripper flange of the gripping mechanism, and
  one of the three elements pivotably linked to the ternary element of the second-four-bar linkage serving as a single drive of the linkage mechanism, the linkage mechanism having a single degree of freedom and being driven solely by the single drive.

2. A gripping mechanism in accordance with claim 1 wherein the moveable gripper jaw or finger cooperates with at least one other fixed or moveable gripper jaw or finger connected or linked directly or indirectly to the gripper flange.

3. A gripping mechanism in accordance with claim 1 wherein one of the three elements pivotably linked to the ternary element of the second four-bar linkage is driven pneumatically, electromotively, by a worm drive, by a spindle drive, by a gear and a rack, by a mechanical spring or a gas spring, or electromagnetically.

4. A gripping mechanism for robots, machines, handling devices and the like, comprising:

a gripper flange,
a linkage mechanism having at least eight bar elements, and
at least one moveable gripper jaw or finger, guided in constrained motion by the linkage mechanism on a trajectory,
the moveable gripper jaw or finger being guided as a coupler of a first four-bar linkage of the linkage mechanism that is pivotably guided by a long binary element and a long ternary element of the first four-bar linkage, the long binary element and the long ternary element being pivotably linked to a fourth element of the first four-bar linkage that is pivotably guided as a coupler of a second four-bar linkage by two elements of the second-four-bar linkage that are pivotably linked to a ternary element of the second four-bar linkage, the ternary element of the first four-bar linkage being pivotably linked to the ternary element of the second four-bar linkage by a further element,
the ternary element of the second four-bar linkage being connected directly or indirectly to the gripper flange of the gripping mechanism, and
one of the three elements pivotably linked to the ternary element of the second-four-bar linkage serving as a drive of the linkage mechanism,
wherein the trajectory approximates a straight line.

5. A gripping mechanism in accordance with claim 4 wherein the trajectory is an exact straight line.

6. A gripping mechanism for robots, machines, handling devices and the like, comprising:
a gripper flange,
a linkage mechanism having at least eight bar elements, and
at least one moveable gripper jaw or finger, guided in constrained motion by the linkage mechanism on a trajectory,
the moveable gripper jaw or finger being guided as a coupler of a first four-bar linkage of the linkage mechanism that is pivotably guided by a long binary element and a long ternary element of the first four-bar linkage, the long binary element and the long ternary element being pivotably linked to a fourth element of the first four-bar linkage that is pivotably guided as a coupler of a second four-bar linkage by two elements of the second-four-bar linkage that are pivotably linked to a ternary element of the second four-bar linkage, the ternary element of the first four-bar linkage being pivotably linked to the ternary element of the second four-bar linkage by a further element,
the ternary element of the second four-bar linkage being connected directly or indirectly to the gripper flange of the gripping mechanism, and
one of the three elements pivotably linked to the ternary element of the second-four-bar linkage serving as a drive of the linkage mechanism,
wherein the coupler of the first four-bar linkage is a jaw carrier and the moveable gripper jaw or finger is a jaw carried by the jaw carrier.

7. A gripping mechanism for robots, machines, handling devices and the like, comprising:
a gripper flange,
a linkage mechanism having at least eight bar elements, and
at least one moveable gripper jaw or finger, guided in constrained motion by the linkage mechanism on a trajectory,
the moveable gripper jaw or finger being guided as a coupler of a first four-bar linkage of the linkage mechanism that is pivotably guided by a long binary element and a long ternary element of the first four-bar linkage, the long binary element and the long ternary element being pivotably linked to a fourth element of the first four-bar linkage that is pivotably guided as a coupler of a second four-bar linkage by two elements of the second-four-bar linkage that are pivotably linked to a ternary element of the second four-bar linkage, the ternary element of the first four-bar linkage being pivotably linked to the ternary element of the second four-bar linkage by a further element,
the ternary element of the second four-bar linkage being connected directly or indirectly to the gripper flange of the gripping mechanism, and
one of the three elements pivotably linked to the ternary element of the second-four-bar linkage serving as a drive of the linkage mechanism,
wherein the first four-bar linkage and the second four-bar linkage each have respective hinges that are coaxially configured as a double hinge on the fourth element of the first four-bar linkage.

8. A gripping mechanism in accordance with claim 7 wherein the first four-bar linkage and the second four-bar linkage each have two hinges that are coaxially configured in pairs as double hinges on the fourth element of the first four-bar linkage.

9. A gripping mechanism for robots, machines, handling devices and the like, comprising:
a gripper flange,
a linkage mechanism having at least eight bar elements,
at least one moveable gripper jaw or finger, guided in constrained motion by the linkage mechanism on a trajectory,
the moveable gripper jaw or finger being guided as a coupler of a first four-bar linkage of the linkage mechanism that is pivotably guided by a long binary element and a long ternary element of the first four-bar linkage, the long binary element and the long ternary element being pivotably linked to a fourth element of the first four-bar linkage that is pivotably guided as a coupler of a second four-bar linkage by two elements of the second-four-bar linkage that are pivotably linked to a ternary element of the second four-bar linkage, the ternary element of the first four-bar linkage being pivotably linked to the ternary element of the second four-bar linkage by a further element,
the ternary element of the second four-bar linkage being configured as a movable slider on a fixed sliding rod that is connected directly or indirectly to the gripper flange of the gripping mechanism and that is pivotably linked directly or indirectly to an additional element that is pivotably linked to one of the elements that are pivotably linked to the ternary element of the second four-bag linkage, the relative movement between the ternary element of the second four-bar linkage and the sliding rod serving as a drive of the gripping mechanism.

10. A gripping mechanism in accordance with claim 9 wherein the trajectory approximates a straight line.

11. A gripping mechanism in accordance with claim 9 wherein the trajectory is an exact straight line.

12. A gripping mechanism in accordance with claim 9 wherein the coupler of the first four-bar linkage is a jaw carrier and the moveable gripper jaw or finger is a jaw carried by the jaw carrier.

13. A gripping mechanism in accordance with claim 9 wherein the moveable gripper jaw or finger cooperates with at least one other fixed or moveable gripper jaw or finger connected or linked directly or indirectly to the gripper flange.

14. A gripping mechanism in accordance with claim 9 wherein the first four-bar linkage and the second four-bar linkage each have respective hinges that are coaxially configured as a double hinge on the fourth element of the first four-bar linkage.

15. A gripping mechanism in accordance with claim 9 wherein the first four-bar linkage and the second four-bar linkage each have two hinges that are coaxially configured in pairs as double hinges on the fourth element of the first four-bar linkage.

16. A gripping mechanism in accordance with claim 9 wherein the ternary element of the second four-bar linkage with the three links supported thereon is driven as the slider on the sliding rod pneumatically, electromotively, by a worm drive, by a spindle drive, by a mechanical spring or a gas spring, or electromagnetically.

17. A gripping mechanism in accordance with claim 9 wherein the sliding rod is linked to the additional element by way of the additional element being linked to the flange to which the sliding rod is connected directly or indirectly.

18. A gripping mechanism in accordance with claim 9 wherein the sliding rod is connected directly or indirectly to a front plate and the sliding rod is linked to the additional element by way of the additional element being linked to the front plate.

\* \* \* \* \*